United States Patent [19]
Ockerman

[11] Patent Number: 5,718,469
[45] Date of Patent: Feb. 17, 1998

[54] SANITARY PET WASTE SCOOP

[76] Inventor: Frank G. Ockerman, 1312 Holiday, Plainview, Tex. 79072

[21] Appl. No.: 782,170

[22] Filed: Jan. 14, 1997

[51] Int. Cl.[6] .............................. A01K 29/00; E01H 1/12
[52] U.S. Cl. ............................................. 294/1.4; 248/101
[58] Field of Search ....................... 294/1.1, 1.3–1.5, 294/55; 15/257.1, 257.7; 248/99, 101

[56] References Cited

U.S. PATENT DOCUMENTS

| | | | |
|---|---|---|---|
| D. 263,512 | 3/1982 | Kawada . | |
| D. 290,416 | 6/1987 | Breuer | 294/1.3 |
| D. 298,369 | 11/1988 | Shun et al. . | |
| 1,953,042 | 3/1934 | Cody | 248/101 |
| 2,421,740 | 6/1947 | Birch, Jr. | 248/101 |
| 3,659,891 | 5/1972 | Pettenon et al. . | |
| 4,010,970 | 3/1977 | Campbell . | |
| 4,149,745 | 4/1979 | Willis | 294/1.4 |
| 4,236,741 | 12/1980 | Emme . | |
| 4,262,948 | 4/1981 | Emme . | |
| 4,447,082 | 5/1984 | Lindholm . | |
| 4,470,627 | 9/1984 | Carroll et al. | 294/55 |
| 4,787,584 | 11/1988 | Palmer . | |
| 5,031,948 | 7/1991 | Groth et al. . | |
| 5,131,704 | 7/1992 | Li . | |

FOREIGN PATENT DOCUMENTS

| | | | |
|---|---|---|---|
| 1010090 | 5/1977 | Canada . | |
| 672873 | 1/1990 | Sweden | 294/1.3 |

OTHER PUBLICATIONS

Pedigrees®, the pet catalog, Holiday Preview 1994, p. 11 and p. 15.

R.C. Steele®, Wholesale Pet Equipment and Kennel Supplies, Fall Preview 1994, p. 27.

*Primary Examiner*—Dean Kramer
*Attorney, Agent, or Firm*—Novak Druce & Burt

[57] ABSTRACT

A sanitary pet waste scoop for collecting and disposing of pet waste. The scoop includes a support hoop couplable to a carrying handle and a securing ring rotatably matingly engageable with the support hoop for pinning a waste bag therebetween. The securing ring is couplable to a torquing handle for accommodating manual rotation of the securing ring into mating engagement with the support hoop. A waste bag is positioned upon the support hoop so that the waste bag is maintained in an open configuration during use of the pet waste scoop. The waste bag has a lower pouch portion and an upper neck portion. The neck portion is draped over the support hoop so that the draped neck portion establishes a sanitary sheath about the support hoop. The waste bag is positioned upon the support hoop so that the waste bag is maintained in an open configuration during use of the pet waste scoop. The support hoop and the securing ring are substantially circular in shape so that the securing ring and the draped neck portion of the waste bag establish a round open mouth into an interior containing space within the lower pouch portion of the waste bag.

14 Claims, 2 Drawing Sheets

SANITARY PET WASTE SCOOP

FIELD OF THE INVENTION

The present invention relates generally to scooping devices. More specifically, it relates to pet products used in maintaining lawns and gardens by collecting pet waste and other similarly sized articles therefrom.

BACKGROUND OF THE INVENTION

Since animals have been domesticated and kept as pets, dealing with their waste has become a frustrating problem. In modern times, the primary problem is that an owner's pets are often confined to the same outdoor spaces frequently used by the human owner. In most instances, these areas will be yard space situated about a home. In other urban settings, it may that an animal is walked in a public place such as a city park for exercise and waste elimination. In all of these situations where either the owner or other humans may come in contact with the waste, it is desirable to collect it and appropriately dispose of the same to prevent possible human contact. In most cases, the ground upon which the waste is dropped will be soil or grass of some type. Therefore, it is highly desirable for the owner of the pet who must collect the waste to be able to do so from a comfortable standing position and without coming into direct contact with the potentially contaminating waste.

Make-shift modes and methods are commonly employed for removing the waste without having to touch it. These modes include shovels, grass rakes, leaf rakes and high water pressure disintegration. Also included are such other means as hand trowels in possible combinations with paper and plastic grocery-style bags or sacks for collection purposes. Because these tools get contaminated with waste, they must be washed prior to being placed into storage or used. In the event a scooping device such as a shovel is used in conjunction with a separate bag or sack, the process becomes a two-handed job that makes controlling an animal, such as a dog on a leash difficult, if not impossible. For obvious reasons, improved methods for performing such a clean-up task are desirable.

Attempts have been made to provide collection devices for such pet waste. Example have been both commercialized and patented. Commercialized examples include the "Moose Scoop" that has a flat nosed pan carried on an extension handle in combination with a spatula-shaped manipulator for pushing the waste onto the horizontally oriented pan. An obvious disadvantage experienced in the utilization of this type of configuration is that the horizontally oriented scoop must lay flat next to the waste on what is often uneven ground that can include loose soil, grass, turf and the like. Still further, it is difficult, if not impossible to scoop the waste exclusively with the single pan in one fluid motion.

Patented examples of tools intended for pet excrement clean-up are also known. Examples include U.S. Pat. No. 3,659,891 issued to Pettenon et al. for a Refuse Collecting Device. This device also has a substantially flat lower most edge that does not facilitate a scooping action upon such ground surfaces as grass and loose dirt. Instead, it works best when being used on substantially flat surfaces.

Common among these examples that are known of attempts to provide a suitable tool for such waste collection, none facilitate use in the ways of the present invention. In some of the examples, more elaborate means are used for connecting a collection bag to a handled scooping device; still others require operator manipulation of portions of the device that contact animal waste and are therefore potentially contaminated with dirty and possibly infectious matter.

For theses reasons, the present invention has been developed to provide pet owners an easily used waste scooping device that can be readily assembled and disassembled, but also durably maintains desired connections during use.

SUMMARY OF THE INVENTION

This invention includes features and/or components that have been invented and selected for their individual and combined benefits and superior performance as a reusable and sanitary scoop that is particularly useful in the collection of pet waste. The system includes multiple components that individually and singularly have new and novel features in and of themselves. Each of the individual components, however, work in association with, and are optimally mated to the others. Together, they yield an overall scooping system that has superior collective effectiveness than means and methods previously known.

Referring now to specific embodiments of the scoop, additional benefits and advantageous features will be appreciated. In one embodiment, the present invention is a sanitary pet waste scoop for collecting and disposing of pet waste. The scoop includes a support hoop couplable to a carrying handle and a securing ring rotatably matingly engageable with the support hoop for pinning a waste bag therebetween. The securing ring is couplable to a torquing handle for accommodating manual rotation of the securing ring into mating engagement with the support hoop.

A waste bag is positioned upon the support hoop so that the waste bag is maintained in an open configuration during use of the pet waste scoop.

The waste bag has a lower pouch portion and an upper neck portion. The neck portion is draped over the support hoop so that the draped neck portion establishes a sanitary sheath about the support hoop.

In another embodiment, the support hoop is coupled to a carrying handle, (not merely couplable) that extends radially therefrom. Similarly, the securing ring is coupled to a torquing handle that also extends radially therefrom. In at least one embodiment, the carrying handle has a greater length than the torquing handle and the carrying handle is sufficiently long so that a user of the scoop may comfortably position the support hoop at ground level while in a standing position.

The waste bag is positioned upon the support hoop so that the waste bag is maintained in an open configuration during use of the pet waste scoop.

The support hoop and the securing ring are substantially circular in shape so that the securing ring and the draped neck portion of the waste bag establish a round open mouth into an interior containing space within the lower pouch portion of the waste bag.

In at least one embodiment, the support hoop has upwardly directed hoop fasteners coupled to the support hoop for rotatably receiving into mating engagement downwardly directed ring fasteners coupled to the securing ring. In the illustrated embodiment, the fasteners each have an insert and an insert receiver so that when the support hoop and the securing ring are rotated into mating engagement, unintended dislocation is resisted and intended dislocation under the user's urging is permitted.

In a preferred embodiment, each of the fasteners is a mirror image of an engageable mating fastener on the opposed component. There are a plurality of fasteners, each being spaced equidistance apart from adjacent fasteners. Each of the fasteners has a camming surface so that mated

3 fasteners have opposed camming surfaces that bind upon one another when rotationally engaged thereby coupling the ring to the hoop with the bag securely sandwiched therebetween.

In the illustrated embodiment, the support hoop has an internally threaded hoop receiver and the carrying handle has an externally threaded hoop end. The threaded hoop end is screwably matable within the threaded hoop receiver.

The securing ring similarly has an internally threaded ring receiver and the torquing handle has an externally threaded ring end. The threaded ring end is also screwably matable within the threaded ring receiver.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

Figure 1:
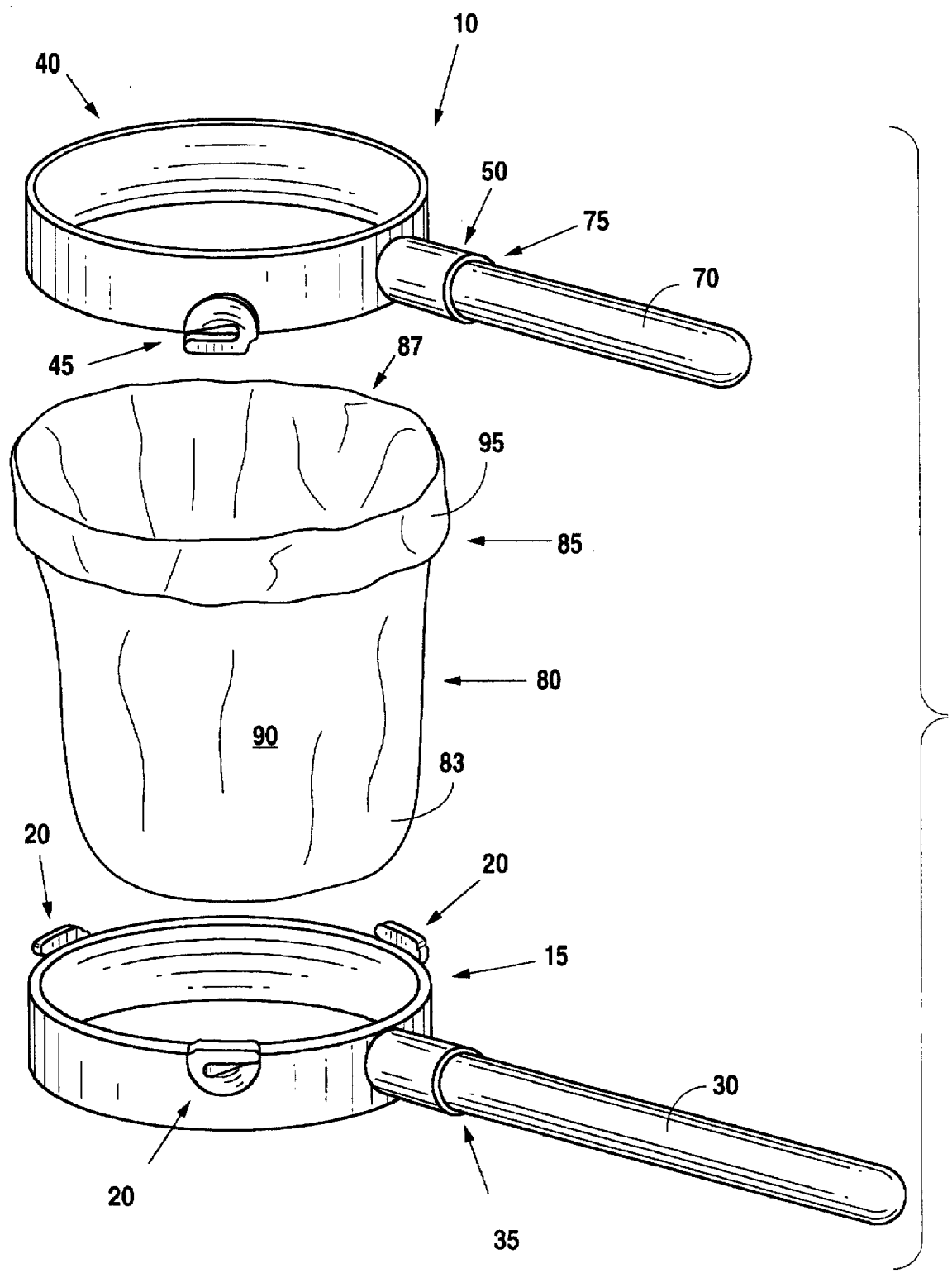
FIG. 1 is an exploded perspective view of one embodiment of the sanitary pet waste scoop constructed according to the present invention.
Figure 2:
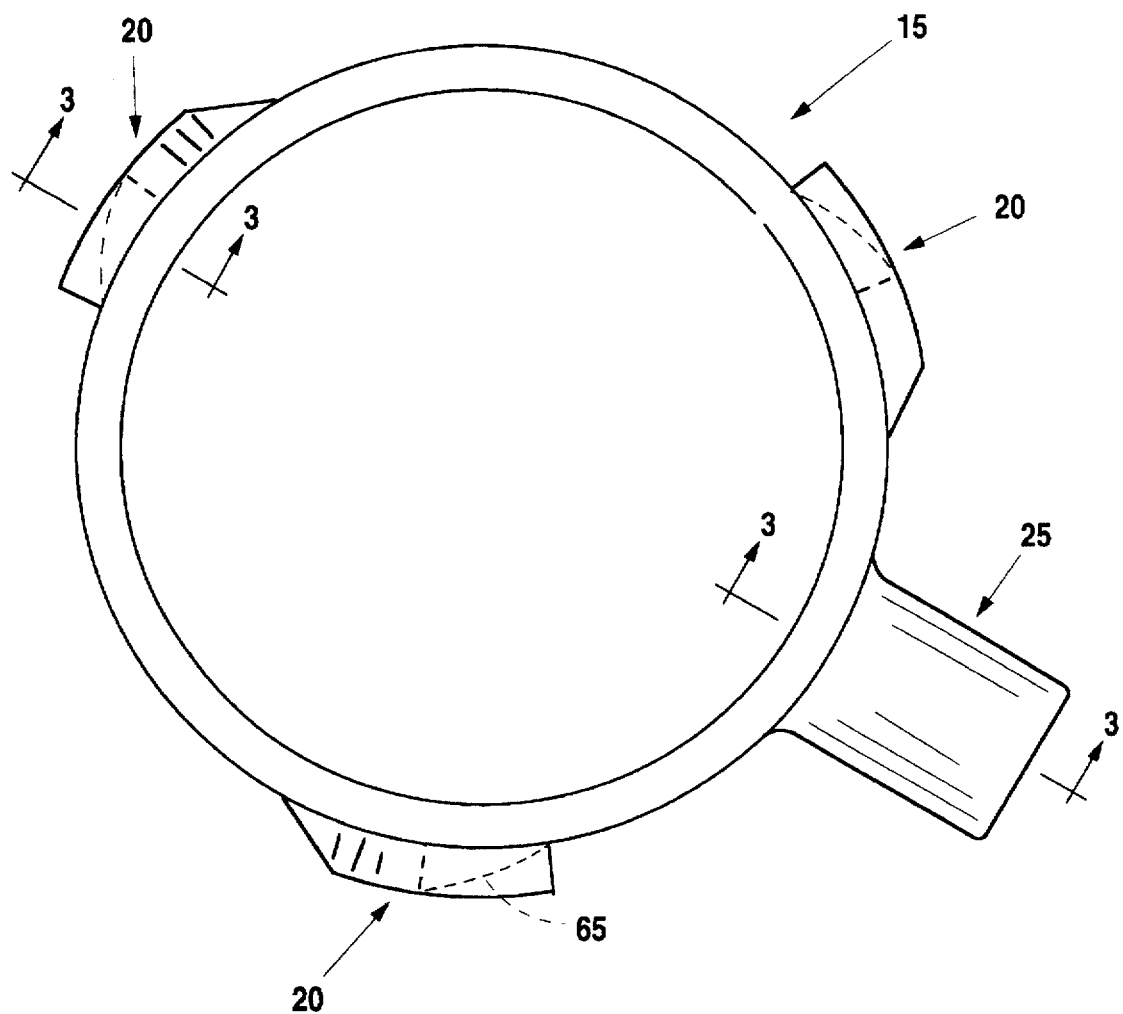
FIG. 2 is a top plan view of the support hoop and a bottom plan view of the securing ring each of which are substantially identical to one another and form mirror images of the other when inverted for rotational mating engagement.

As required, detailed embodiments of the present invention are disclosed herein; however, it is to be understood that the disclosed embodiments are merely exemplary of the invention that may be embodied in various and alternative forms. The Figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Certain terminology will be used in the following description for convenience and reference only and not for purposes of limitation. For example, the words "rightwardly", "leftwardly", "upwardly" and "downwardly" will refer to directions in the drawings to which reference is made. The words "inwardly" and "outwardly" refer to directions toward and away from, respectively, the geometric center of the structure being referred to. This terminology includes these words, specifically mentioned derivatives thereof, and words of similar import.

Furthermore, elements may be recited as being "coupled"; this terminology's use anticipates elements being connected together in such a way that there may be other components interstitially located between the specified elements, and that the elements may be connected in fixed or movable relation one to the other. Certain components may be described as being adjacent to one another. In these instances, it is expected that such a relationship so described shall be interpreted to mean that the components are located proximate to one another, by not necessarily in contact with each other. Normally there will be an absence of other components positioned therebetween, but this is not a requirement. Still further, some structural relationships or orientations may be designated with the word "substantially". In those cases, it is meant that the relationship or orientation is as described, with allowances for variations that do not effect the cooperation of the so described component or components.

An illustrative embodiment of the present invention is shown in FIG. 1. Therein, the three primary components of a sanitary pet waste scoop 10 are shown in an exploded, to be assembled configuration. A support hoop 15 is shown in a lower most location with a waste bag 80 positioned thereabove, and below a securing ring 40. For use, these three components are releasably coupled together to form the waste scoop 10. For ease in assembly, the support hoop 15 and securing ring 40 are similarly constructed and in the illustrated example identically constructed so that when the securing ring 40 is inverted above the support hoop 15, fastening members on each engage one another upon relative rotation for connecting the hoop 15 and ring 40 releasably together. Prior to making such connection, however, the waste bag 80 is installed within a center portion of the support hoop 15 with a lip of the bag draped over the body of the hoop 15. In this manner when the securing ring 40 is connected to the hoop 15, the waste bag 80 is pinned therebetween and held fast during use.

The fastener members on the support hoop 15 are hoop fasteners 20. The fastener members on the securing ring 40 are constructed similarly to the hoop fasteners 20 and are designated as ring fasteners 45. Each of the fasteners 20,45 include an insert portion 55 and an insert receiver portion 60. Additionally, each fastener 20,45 includes a camming surface 65. As described above, the hoop 15 and ring 40 are coupled together at the respective fasteners 20,45 by relative rotational movement into one another. Upon such movement, the opposing inserts 55 and insert receivers 60 engage one another and tighten down as the opposing camming surfaces 65 tightly bind upon one another. The mating of the insert 55 and receiver 60 serve as a releasable locking mechanism for securing the hoop 15 and ring 40 together once manually secured. This securement is enhanced by the binding effect achieved on the opposing camming surfaces 65 that have been rotated onto one another. As will be described hereinbelow, the relative rotation of the hoop 15 and ring 40 is manually accomplished by the user, as is disengagement of the two members from one another after use.

The waste bag 80 includes a lower pouch portion 83 and an upper neck portion 85. In use, the extreme upper portion of the neck 85 is draped over the body portion of the support hoop 15 so that a sanitary sheath 95 is established about the hoop 15. When the securing ring 40 is fastened upon the support hoop 15, the over-draped neck 85 of the bag 80 is pinned and secured therebetween in a sandwiched manner so that a substantially round open mouth 87 is established as an opening into an interior containing space 90 of the bag 80. In this way, a scooping device is fashioned that maintains a rigid opening 87 with the flexible waste bag 80 attached thereto for receipt and collection of pet waste.

As may be best appreciated in FIG. 1, the support hoop 15 is coupled to a carrying handle 30. The carrying handle 30 is sufficiently long to permit the waste scoop 10 to be utilized by a standing user. The securing ring 40 also has a torquing handle 70 coupled thereto. The torquing handle 70 is shorter than the carrying handle 30 and is used for being manually grasped during assembly and disassembly of the scoop 10. The handle 70 may be readily grasped by an operator and used to rotate the securing ring 40 upon the support hoop 15 when the carrying handle 30 is grasped in the users other hand. The hoop 15 and ring 40 may then be relatively rotated into and out of coupled engagement using two hands.

Figure 3:
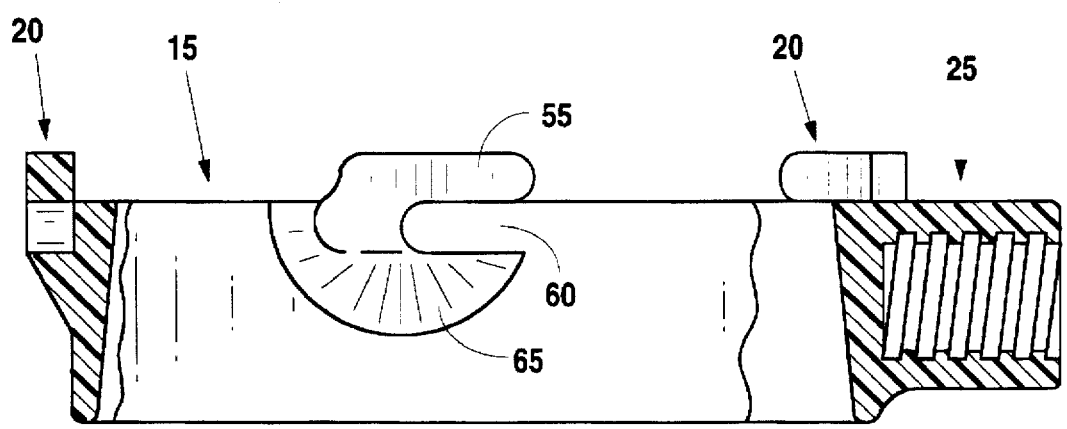
FIG. 3 is a partial cross-sectional elevational view of the hoop and ring taken along the line 3—3 of FIG. 2.

The support hoop 15 includes an internally threaded hoop receiver 25 as may be best appreciated in FIG. 3. Similarly, the securing ring 40 has an internally threaded ring receiver 50 that is constructed substantially identical to the threaded hoop receiver 25. For purposes of mating engagement, the carrying handle 30 has an externally threaded hoop end 35 that is screwingly engagable with the threaded hoop receiver 25. Likewise, the torquing handle has an externally threaded ring end 75 that screwingly engages the ring receiver 50. By this construction, the waste scoop 10 can be broken down into its component parts easily and readily for storage and transportation. Likewise, quick assembly is also permitted by the same construction features.

In the spirit of conservation and reuse of items normally to be disposed of, the sanitary pet waste scoop 10 constructed according to present invention employs common plastic grocery bags that are usually discarded after use. These plastic bags have sufficient strength for use in the scoop 10 as the waste bag 80, as well as satisfactory flexibility for being draped over the body of the support hoop 15 to form a sanitary sheath 95. By forming such a sheath, the support ring is continually protected from contact with the animal waste and therefore is maintained in a sanitary condition. This is important in that the support hoop 15 is the piece most likely to be contacted by the user when installing the waste bag 80.

The hoop 15 and ring 40 are contemplated to most advantageously be constructed from a durable and at least semi-rigid plastic or similarly performing material. Rigidity is desired to maintain the utilitarian shape of the scoop 10 during use, but slight flexibility is required for proper performance of the fastener members. It is also contemplated that these components may be readily constructed from steel having similar performance characteristics. The handles 30,70 may be made from like materials of similar performance parameters.

A reusable and sanitary pet waste scooping system and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is as follows:

1. A sanitary pet waste scoop for collecting and disposing of pet waste, said scoop comprising:
    a support hoop coupled to a carrying handle;
    a securing ring rotatably matingly engagable with said support hoop for pinning a waste bag therebetween;
    said securing ring couplable to a torquing handle for accommodating manual rotation of said securing ring into mating engagement with said support hoop;
    said carrying handle extending radially from said support hoop;
    said carrying handle having a greater length than said torquing handle; and
    said carrying handle being sufficiently long so that a user of said scoop may comfortably position said support hoop at ground level while in a standing position.

2. The sanitary pet waste scoop for collecting and disposing of pet waste as recited in claim 1; said scoop further comprising:
    said securing ring coupled to a torquing handle, said torquing handle extending radially therefrom.

3. The sanitary pet waste scoop for collecting and disposing of pet waste as recited in claim 1; said scoop further comprising:
    a waste bag positioned upon said support hoop so that said waste bag is maintained in an open configuration during use of said pet waste scoop.

4. The sanitary pet waste scoop for collecting and disposing of pet waste as recited in claim 3; said scoop further comprising:
    said waste bag comprising a lower pouch portion and an upper neck portion; and
    said neck portion being draped over said support hoop so that said draped neck portion establishes a sanitary sheath about said support hoop.

5. The sanitary pet waste scoop for collecting and disposing of pet waste as recited in claim 4; said scoop further comprising:
    said support hoop and said securing ring being substantially circular so that said securing ring and said draped neck portion of said waste bag establish a round open mouth into an interior containing space within the lower pouch portion of the waste bag.

6. The sanitary pet waste scoop for collecting and disposing of pet waste as recited in claim 1; said scoop further comprising:
    said support hoop having upwardly directed hoop fasteners coupled to said support hoop for rotatably receiving into mating engagement downwardly directed ring fasteners coupled to said securing ring.

7. The sanitary pet waste scoop for collecting and disposing of pet waste as recited in claim 6; said scoop further comprising:
    said fasteners each having an insert and an insert receiver so that when said support hoop and said securing ring are rotated into mating engagement unintended dislocation is resisted and intended dislocation under the user's urging is permitted.

8. The sanitary pet waste scoop for collecting and disposing of pet waste as recited in claim 7; said scoop further comprising:
    each of said fasteners being a mirror image of an engagable mating fastener.

9. The sanitary pet waste scoop for collecting and disposing of pet waste as recited in claim 8; said scoop further comprising:
    a plurality of fasteners, each of said fasteners being spaced equidistance apart from adjacent fasteners.

10. The sanitary pet waste scoop for collecting and disposing of pet waste as recited in claim 6; said scoop further comprising:
    each of said fasteners being a mirror image of an engagable mating fastener.

11. The sanitary pet waste scoop for collecting and disposing of pet waste as recited in claim 6; said scoop further comprising:
    each of said fasteners having a camming surface so that mated fasteners have opposed camming surfaces that bind upon being rotationally engaged thereby coupling said ring to said hoop with said bag securely sandwiched therebetween.

12. The sanitary pet waste scoop for collecting and disposing of pet waste as recited in claim 11; said scoop further comprising:
    said support hoop having an internally threaded hoop receiver and said carrying handle having an externally threaded hoop end;

said threaded hoop end being screwably matable within said threaded hoop receiver.

13. The sanitary pet waste scoop for collecting and disposing of pet waste as recited in claim 11; said scoop further comprising:

said securing ring having an internally threaded ring receiver and said torquing handle having an externally threaded ring end;

said threaded ring end being screwably matable within said threaded ring receiver.

14. The sanitary pet waste scoop for collecting and disposing of pet waste as recited in claim 13; said scoop further comprising:

said support hoop having an internally threaded hoop receiver and said carrying handle having an externally threaded hoop end;

said threaded hoop end being screwably matable within said threaded hoop receiver.

\* \* \* \* \*